United States Patent [19]

Comezzi

[11] Patent Number: 5,598,498
[45] Date of Patent: Jan. 28, 1997

[54] MODULAR OPTICAL FIBER CORE TAPE, SEPARABLE INTO A PLURALITY OF TAPE UNITS OR MODULES, METHOD OF MANUFACTURING SUCH TAPE AND OPTICAL CABLE USING THE SAME

[75] Inventor: Gerardo Comezzi, Rome, Italy

[73] Assignee: Alcatel Cavi S.p.A., Cologno Monzese, Italy

[21] Appl. No.: 316,128

[22] Filed: Sep. 30, 1994

[30] Foreign Application Priority Data

Oct. 12, 1993 [IT] Italy .................. MI93A2152

[51] Int. Cl.⁶ .................................................. G02B 6/44
[52] U.S. Cl. ................................................................ 385/114
[58] Field of Search ................... 385/100–114, 115, 385/121, 141

[56] References Cited

U.S. PATENT DOCUMENTS

| | | | |
|---|---|---|---|
| 4,720,165 | 1/1988 | Tokuda et al. ................. | 350/96.24 |
| 4,815,814 | 3/1989 | Ulijasz ................................. | 385/114 |
| 4,913,515 | 4/1990 | Braunmiller et al. ............. | 350/96.23 |

FOREIGN PATENT DOCUMENTS

| | | |
|---|---|---|
| 0321787 | 6/1989 | European Pat. Off. . |
| 8901206 | 5/1989 | Germany . |

OTHER PUBLICATIONS

Patent Abstracts of Japan, vol. 13, No. 389 (P–925), Aug. 29, 1989 and JP–A–01 137 209 (Sumitomo), May 30, 1989.
Patent Abstracts of Japan, vol. 12, No. 499 (P–807), Dec. 27, 1988 and JP–A–63 208 814 (Hitachi), Aug. 30, 1988.

*Primary Examiner*—John Ngo
*Attorney, Agent, or Firm*—Ware, Fressola, Van Der Sluys & Adolphson

[57] ABSTRACT

The tape of the present invention has at least one wire-shaped, high tensile strength separation element embedded into the coating resin introduced in line, at the longitudinal section between contiguous optical fiber filaments and designed to easy the manual split of the tape into tape units each comprising, in particular, four fibers without any special tool.

18 Claims, 1 Drawing Sheet

MODULAR OPTICAL FIBER CORE TAPE, SEPARABLE INTO A PLURALITY OF TAPE UNITS OR MODULES, METHOD OF MANUFACTURING SUCH TAPE AND OPTICAL CABLE USING THE SAME

TECHNICAL FIELD

The present invention relates to a modular optical fiber core tape, separable into a plurality of tape units or modules, to a method of manufacturing such tape and to an optical cable using the same.

BACKGROUND OF THE INVENTION

Small-sized optical cables are nowadays available on the market, comprising inside them tapes formed by four optical fibers aligned and embedded into a common coating generally made of acrylate resins, of the same nature as the primary coating of the optical fibers.

Large-sized cables (typically 200–1000 optical fibers) are also available, using ribbons or modules of 8, 12, 16, . . . optical fibers. In particular 8-fiber modules are used, in turn separable into two 4-fiber modules.

The need and utility of the separability is due to the compatibility of the 8-fiber tapes with the widely-circulated 4-fiber tapes with which they can therefore be promiscuously handled, fiber-to-fiber jointed through multiple or single melting or through multiple or single connectors.

In order to be able to easily split the tapes into 4-fiber modules on the field without damaging the optical fibers and without using special tools, several solutions have been adopted. One of these is based upon a double embedding, i.e. two 4-fiber modules are preliminarly assembled and cross-linked and subsequently a common coating is applied around the two flanked modules.

Clearly this solution, besides being expensive because of the double process, entails an increase in size and weight both of the tape and the cable employing Other solutions are based upon the narrowing of the thickness of the covering resin at the portion of the split line between the two modules.

In one of them, such narrowing is obtained by covering the two optical fibers adjacent to the split line along a longitudinal cross-section of the tape with flexible resin having low Young's modulus and then embedding the whole into rigid resin having high Young's modulus. In such way, at the split line, the thickness of the rigid resin coating becomes smaller. However, also this type of tape has the same drawbacks as the above-mentioned double process solution.

Another solution is based upon the application of a very thin layer of resin (typically 20 micron thick against 50–80 microns generally used) with the expedient of adding a release agent at the line between contiguous optical fibers when the tape is to be split in order to make the resin softer at the separation line during split.

Also this solution has drawbacks since, besides weakening the structure of the tape, the introduction of release agents may give rise to problems, especially in the presence of humidity. In fact, since the acrylate of the coating is a hydrophilic material, the eventual absorption of water into the coating can entail the localization of the same in the discontinuity zone created by the releasing agent with bubble formation which could cause transmission losses due to microbendings of the optical fibers. Moreover, tapes used nowadays still require the use of a specific tool for cutting and/or eliminating flashes.

DISCLOSURE OF THE INVENTION

It is an object of the present invention to overcome the above described prior art drawbacks.

This and other objects which will become more apparent hereinafter, are achieved according to the present invention through a modular optical fiber core tape, separable into a plurality of tape units or modules and by a method of manufacturing the same, which are characterized in that at least one high tensile strength, thread-like separation element, made of a material chemically compatible with the covering resin is embedded, in-line, into the resin in correspondence with at least one longitudinal cross-section between contiguous optical fibers of two adjacent modules and subjected, still in-line, to a tensile stress under in-line control of the latter.

These and other objects, features and advantages of the present invention will become more apparent in light of the detailed description of a best mode embodiment thereof, as illustrated in the accompanying drawing.

BEST MODE FOR CARRYING OUT THE INVENTION

Figure 1:
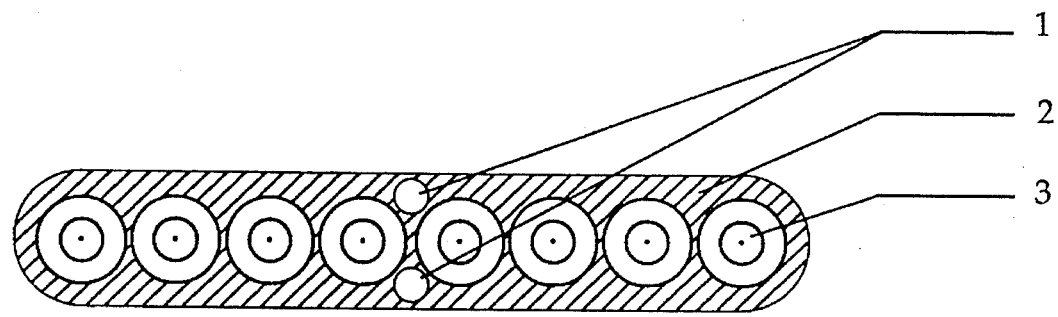
FIG. 1 represents schematically a cross-section of an 8-fiber tape separable in accordance with the present invention.

With reference to the figures, and in particular to FIG. 1, the tape is composed of a series (eight in the embodiment illustrated herein, separable into two 4-fiber modules) of optical fibers 3 disposed in a parallel arrangement on a plane, embedded into a protective coating matrix 2 generally made of acrylates of the same nature as the primary coating of the optical fibers.

As the split line of the modules (between the 4th and the 5th fiber in the illustrated embodiment), at least one (two in FIG. 1) separation element 1 made of a material chemically compatible with the acrylates of the matrix and having high tensile strength is embedded in the matrix 2.

In the illustrated embodiment, the two separation elements 1 are thread-like with a circular cross-section and are arranged symmetrically with respect to the plane formed by the axes of the optical fibers 3.

The separation element can be formed by wires made of polyamide resin or other synthetic materials, and therefore polyester or aramid fiber yarns, fiber glass cords, carbon fibers or metallic wires could be used as well. At any rate, the wires used should have a tensile strength preferably not less than 35 N/sq.mm.

Advantageously, the separation element can be suitably colored in such a way as to give the matrix an orientation of the type, e.g., up-down to which reference is made in numbering the optical fibers which, therefore, can be embedded in the matrix without preventive coloration, or the element can be colorless if the optical fibers are already colored, with the same result.

The optical fiber core tape is manufactured by suitably applying in line the eight fibers paralleled up and one or more (typically two) separation elements.

The manufacturing process, preferably but not exclusively, of the typic acrylate cross-linking through UV irradiation comprises the in-line control of the tensile stress of both the eight optical fibers and of the separation element(s) at the same time, preferably but not necessarily through electronic or electro-mechanical adjustment of the decoilers.

Therefore, it is necessary to use at least one decoiler for the separation elements, or to use wheels or continuous belts in line for detection and braking of the separation elements with control of the braking and therefore of the tensile stress, the braking force having such values as to allow tensile stresses on the separation elements preferably comprised between 5 cN and 50 cN. The resin of the matrix is preferably, but not exclusively, applied by pressure through suitably calibrated dies, which also perform functions of aligning the tape structure and forming the profile to comply with selected dimensions.

For instance, in a tape comprised of eight fibers already provided with suitable acrylate primary coating, each having outer diameter 245+10 microns and already colored some microns thick using UV cross-linkable or thermally-dried inks, one or more wires 50 to 250 micron diameter can be used as separation element(s), depending on the needs of use.

The resin matrix is applied around the whole array composed of the eight optical fibers and separation elements according to the process described above; its function is to embed optical fibers and separation elements in a one piece (whose cross-section is shown in FIG. 1), said matrix being also a secondary coating for the embedded optical fibers, and a cabling base module in optical fiber cables generally, but not necessarily, large-sized cables. Such tape has outer dimensions generally confined within:

* thickness: 380 microns plus 50 microns
* width: 2150 microns plus 200 microns

The split of the tape into 4-optical fiber modules is obtained manually in a simple manner by exerting a direct tensile force on the separation element(s) towards the outside of the tape while keeping the element, preferably but not necessarily, stretched perpendicularly to the fiber's axis and to the tape's surface. Thus the invention fully achieves the above-mentioned object. Through the structure and the method described above in accordance with the present invention there is provided a modular optical fiber core tape, in particular an 8-optical fiber tape, having limited dimensions, a compact structure unweakened at any point, quite the contrary strengthened, which fully surrounds the fibers and therefore in every circumstances it acts as an adherent secondary coating for the fibers.

Figure 2:
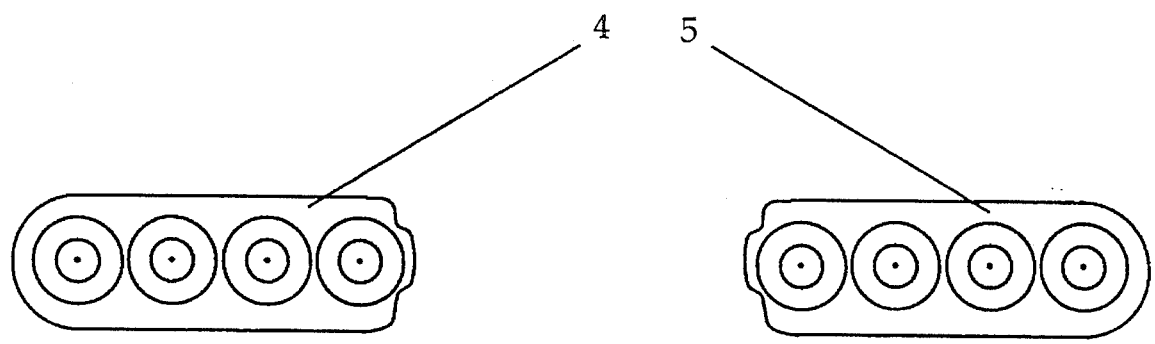
FIG. 2 represents two modules, each incorporating four optical fibers, obtained by splitting the tape of FIG. 1.

Moreover, the tape according to the invention does not require the use of any special tool neither for splitting the modules (4,5) nor for the eventual cutting and/or elimination of flashes, since the split operation of the embedded separation element is clear-cut (FIG. 2) and accurate, i.e., it is as if the cutting tool were pre-introduced into the tape matrix.

A further intrinsic advantage of the tape in accordance with the invention, lies in the possibility of a different identification code for the optical fibers.

In fact nowadays it is customary to color the fibers with differently colored inks. The presence of the colored separation element inside the tape matrix in accordance with the present invention makes this unnecessary with obvious cost savings and improved reliability of the product.

While the invention has been described with reference to a specific embodiment of an 8-optical fiber tape in order to show the implementation of the inventive concept, it should be noted that the invention is not to be construed as limited to the illustrated embodiment, such being susceptible to those modifications and variations which being apparent to those skilled in the art should be understood as falling within the above-mentioned inventive concept.

For instance, in order to further improve the split operation, one or more variations in the profile of the cross section, e.g. notches, can be provided at such extent, as to number and dimensions, that the structure of the tape is not weakened, as well as should the separation element not be pulled correctly, means could be provided for the purpose.

Naturally, the materials and the dimensions can be varied according to the needs of production and use still observing the characteristics illustrated, described and hereinafter claimed.

I claim:

1. Modular optical fiber core tape, separable into a plurality of tape units or modules, for use in optical cables, said tape including a modular series of optical fibers, each having a primary coating, disposed in a parallel arrangement on a plane and embedded in a synthetic resin matrix, a splitting into said modules of said tape being provided for along at least one longitudinal section between contiguous fibers of consecutive modules, wherein at least one separation element is embedded in said resin matrix at said at least one longitudinal section for facilitating the splitting of the tape along said longitudinal section, and wherein the synthetic resin matrix is a material that is cuttable by the separation elements and that is chemically compatible with the primary coating of each said optical fiber.

2. Modular optical fiber core tape according to claim 1, wherein said at least one separation element is thread-like and has a tensile strength greater than or equal to thirty-five Newtons per square millimeter.

3. Modular optical fiber core tape according to claim 2, wherein said at least one thread-like element has its outer diameter between fifty and two hundred and fifty microns.

4. Modular optical fiber core tape according to claim 1, wherein said at least one separation element is colored and said optical fibers have an uncolored outer coating.

5. Modular optical fiber core tape according to claim 1, wherein at least one variation in a cross-sectional profile of the matrix is provided along the at least one longitudinal section.

6. Method of manufacturing a separable optical fiber core tape having an acrylate cross-linking through ultraviolet irradiation, in which a tape matrix resin is applied by pressure through suitably calibrated dies for also aligning the tape structure and forming a cross-sectional profile thereof with selected dimensions, further comprising the steps of:

embedding at least one thread-like separation element in line in said resin matrix and subjecting said at least one thread-like element, during said step of embedding, to a selected tensile stress with in line control of the latter.

7. Method according to claim 6, wherein said tensile stress which said at least one separation element is subjected to, is between five cN and fifty cN.

8. Optical fiber cable, for use in telecommunication networks, comprising at least one separable optical fiber core tape separable into a plurality of tape units or modules, for use in optical cables, said tape including a modular series of optical fibers, each having a primary coating, disposed in a parallel arrangement on a plane and embedded in a synthetic resin matrix, a splitting into said modules of said tape being provided for along at least one longitudinal section between contiguous fibers of consecutive modules, wherein at least one separation element is embedded in said resin matrix at said at least one longitudinal section for facilitating the splitting of the tape along said longitudinal section, and wherein the synthetic resin matrix is a material that is cuttable by the separation elements and that is chemically compatible with the primary coating of each said optical fiber.

9. Optical fiber cable as in claim 8, wherein said at least one separation element is thread-like and has a tensile strength greater than or equal to thirty-five Newtons per square millimeter.

10. Optical fiber cable as in claim 9, wherein said at Least one thread-like element has its outer diameter between 50 and 250 microns.

11. Optical fiber cable as in claim 8, wherein said at least one separation element is colored and said optical fibers have an uncolored outer coating.

12. Modular optical fiber core tape as claimed in claim 1, wherein said separation element is made of a material that is chemically compatible with the resin and of high tensile strength.

13. Modular optical fiber core tape as claimed in claim 2, wherein said separation element is made of a material that is chemically compatible with the resin.

14. Modular optical fiber core tape as claimed in claim 3, wherein said separation element is made of a material that is chemically compatible with the resin.

15. Modular optical fiber core tape as claimed in claim 4, wherein said separation element is made of a material that is chemically compatible with the resin and of high tensile strength.

16. Modular optical fiber core tape as claimed in claim 5, wherein said separation element is made of a material that is chemically compatible with the resin and of high tensile strength.

17. Method of manufacturing the modular optical fiber core tape of claim 1 having an acrylate cross-linking through ultraviolet irradiation, in which a tape matrix resin is applied by pressure through suitably calibrated dies for also aligning the tape structure and forming a cross-sectional profile thereof with selected dimensions, further comprising the steps of:

embedding at least one thread-like separation element in line in said resin matrix and subjecting said at least one thread-like element, during said step of embedding, to a selected tensile stress with in-line control of the latter.

18. Method according to claim 17, wherein said tensile stress which said at least one separation element is subjected to, is between 5 cN and 50 cN.

* * * * *

UNITED STATES PATENT AND TRADEMARK OFFICE
CERTIFICATE OF CORRECTION

PATENT NO. : 5,598,498
DATED      : January 28, 1997
INVENTOR(S) : G. Comezzi

It is certified that error appears in the above-indentified patent and that said Letters Patent is hereby corrected as shown below:

```
On the title page:
    Item: [57] , line 6, please cancel "easy" and
substitute --facilitate-- therefor.

At column 1, line 40, after "employing", please
insert --it.--.

At column 5, line 16 (claim 10, line 1), please
cancel "Least" and substitute --least-- therefor.
```

Signed and Sealed this

Twenty-fourth Day of June, 1997

*Attest:*

BRUCE LEHMAN

*Attesting Officer*     *Commissioner of Patents and Trademarks*